United States Patent
Sakata et al.

(10) Patent No.: US 7,502,407 B2
(45) Date of Patent: *Mar. 10, 2009

(54) WIRELESS COMMUNICATION AND WIRELESS COMMUNICATION APPARATUS

(75) Inventors: Ren Sakata, Kanagawa-Ken (JP); Syuichi Sekine, Kanagawa-Ken (JP); Mutsumu Serizawa, Tokyo (JP); Hiroki Shoki, Kanagawa-Ken (JP); Hiroshi Tsurumi, Kanagawa-Ken (JP); Shuichi Obayashi, Fort Lee, NJ (US); Tomoko Adachi, Kanagawa-Ken (JP); Kiyoshi Toshimitsu, Kanagawa-Ken (JP); Tsuguhide Aoki, Kanagawa-Ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/877,936

(22) Filed: Oct. 24, 2007

(65) Prior Publication Data

US 2008/0049665 A1    Feb. 28, 2008

Related U.S. Application Data

(63) Continuation of application No. 10/440,115, filed on May 19, 2003, now Pat. No. 7,319,714.

(30) Foreign Application Priority Data

May 17, 2002    (JP)    ............................ 2002-143546

(51) Int. Cl.
*H04B 17/02* (2006.01)
*H04B 7/02* (2006.01)

(52) U.S. Cl. ...................... 375/211; 375/267; 375/299; 375/347

(58) Field of Classification Search ................. 375/211, 375/267, 299, 347
See application file for complete search history.

(56) References Cited

U.S. PATENT DOCUMENTS

| 5,859,874 | A | 1/1999 | Wiedeman et al. |
| 6,097,771 | A | 8/2000 | Foschini |
| 2003/0060221 | A1 | 3/2003 | Eberlein et al. |

OTHER PUBLICATIONS

Mischa Dohler, et al., "Virtual Antenna Arrays", Wireless World Research Forum (WWRF), WG 4: New Wireless Technologies, URL, Dec. 7, 2001, pp. 1-6.

(Continued)

*Primary Examiner*—Kevin Y Kim
(74) *Attorney, Agent, or Firm*—Oblon, Spivak, McClelland, Maier & Neustadt, P.C.

(57) ABSTRACT

A wireless communication system which transmits and receives a signal by using a plurality of wireless apparatuses, comprising: a first wireless apparatus group having a plurality of transmitting apparatuses, each transmitting a wireless signal based on a first control signal, said first wireless apparatus group forming a first ad-hoc network between said transmitting apparatuses; and a second wireless apparatus group having a plurality of destination apparatuses, each receiving the wireless signal transmitted from said first wireless apparatus group, said second wireless apparatus group transmitting and receiving the wireless signal received by said destination apparatuses based on a second control signal, and said second wireless apparatus group forming a second ad-hoc network between said destination apparatuses different from said first ad-hoc network.

14 Claims, 13 Drawing Sheets

TRANSMITTING TERMINAL GROUP

DESTINATION TERMINAL GROUP

OTHER PUBLICATIONS

Tetsushi Abe, et al., "Space-Time Turbo Equalization for Frequency Selective MIMO Channels", 2001 General Meeting of Institute of Electronics, Information and Communication Engineers, Institute of Electronics, Information and Communication Engineers Corporation Report 1, SB-13-6, Mar. 9, 2001, pp. 11 and 12.

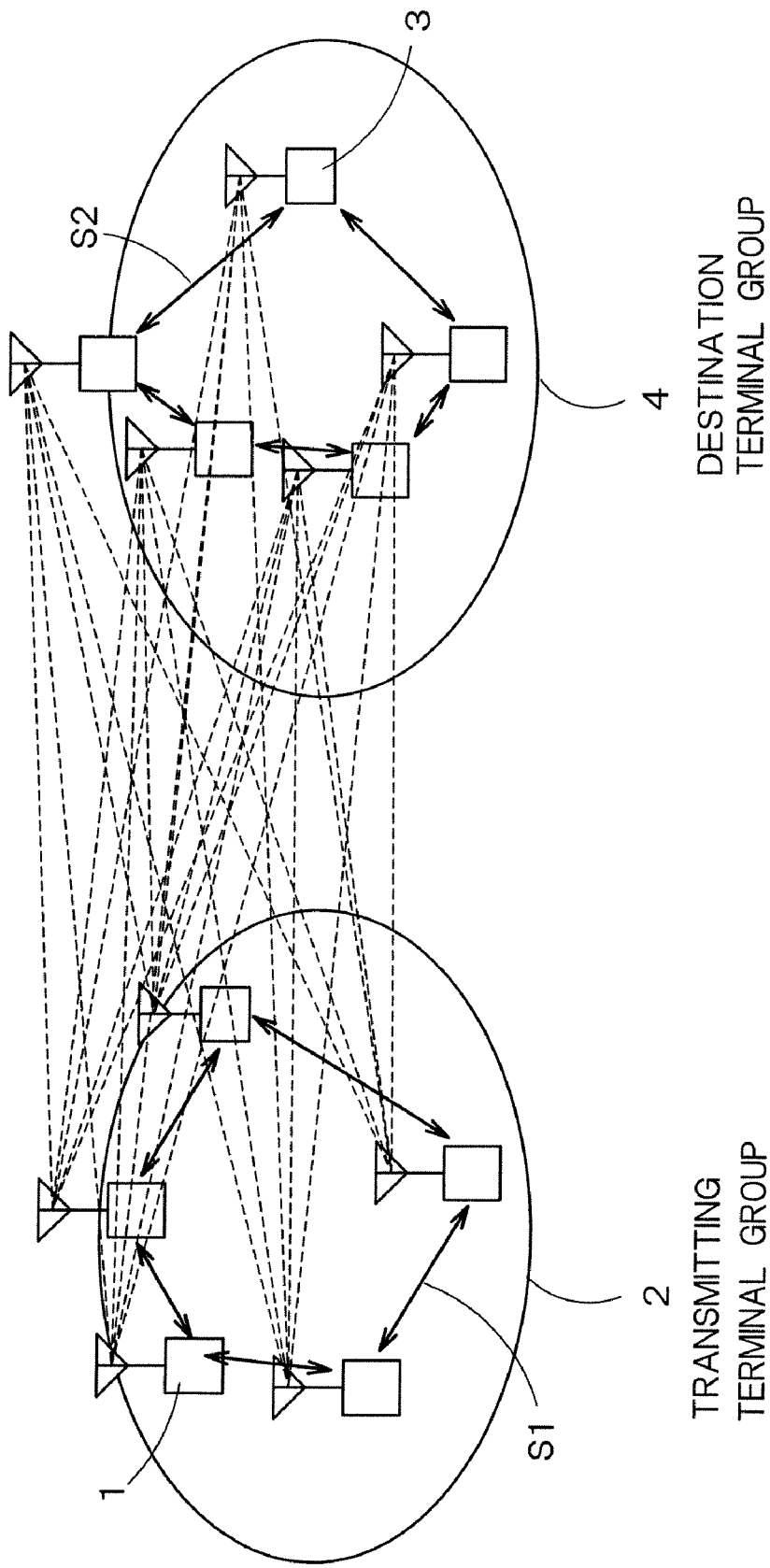
F I G. 1

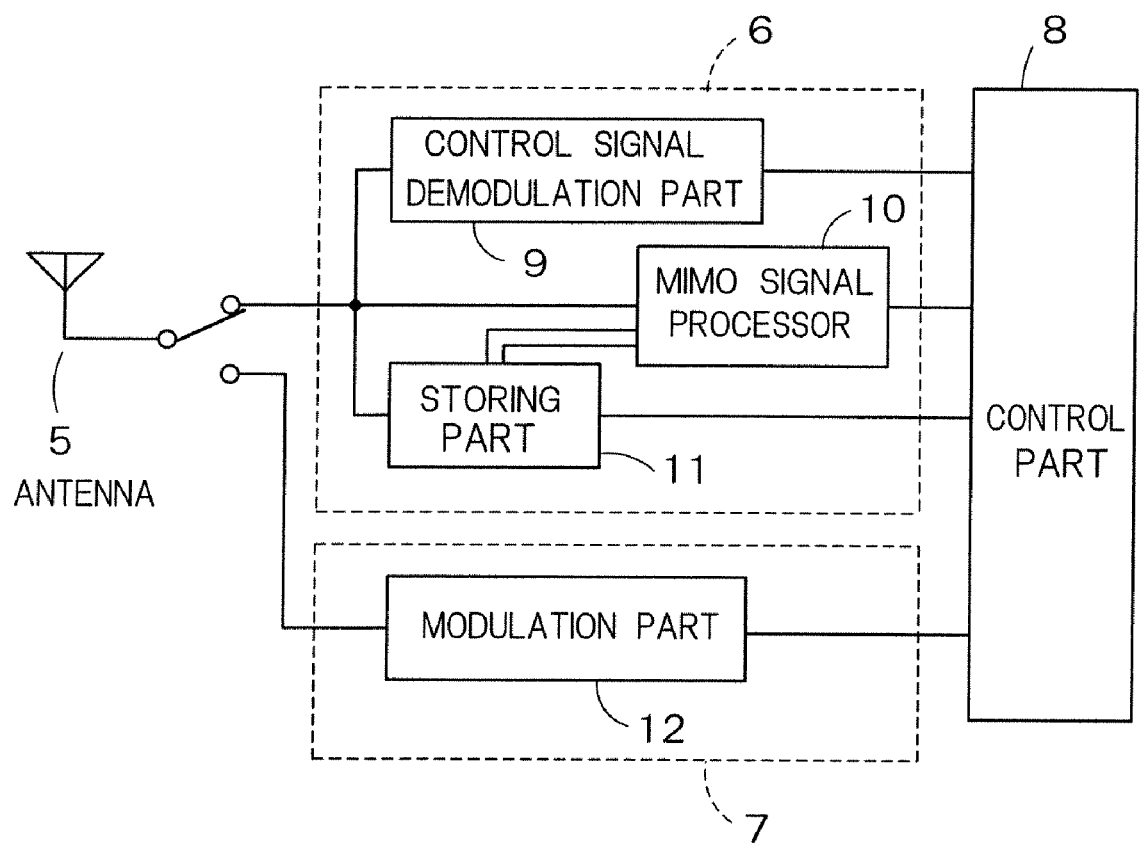
F I G. 2

| PHYSICAL LAYER HEADER | DESTINATION TERMINAL ADDRESS | MIMO TRANSMISSION FREQUENCY | MIMO TRANSMISSION TIMING | TERMINAL B TRANSMISSION INFORMATION | TERMINAL C TRANSMISSION INFORMATION | TERMINAL D TRANSMISSION INFORMATION | TERMINAL E TRANSMISSION INFORMATION |
|---|---|---|---|---|---|---|---|
| d1 | d2 | d3 | d4 | | d5 | | |

F I G. 5

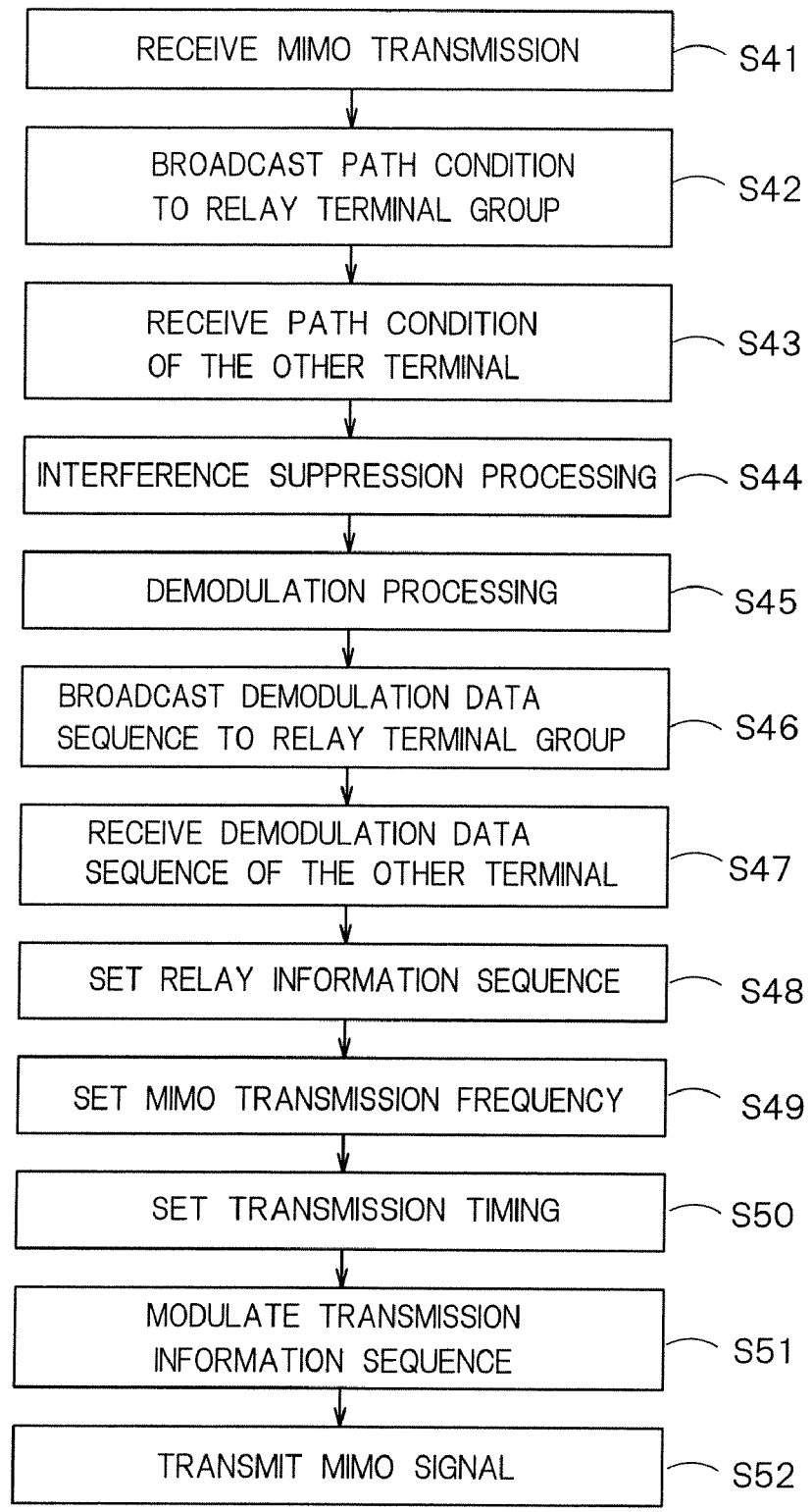
F I G. 10

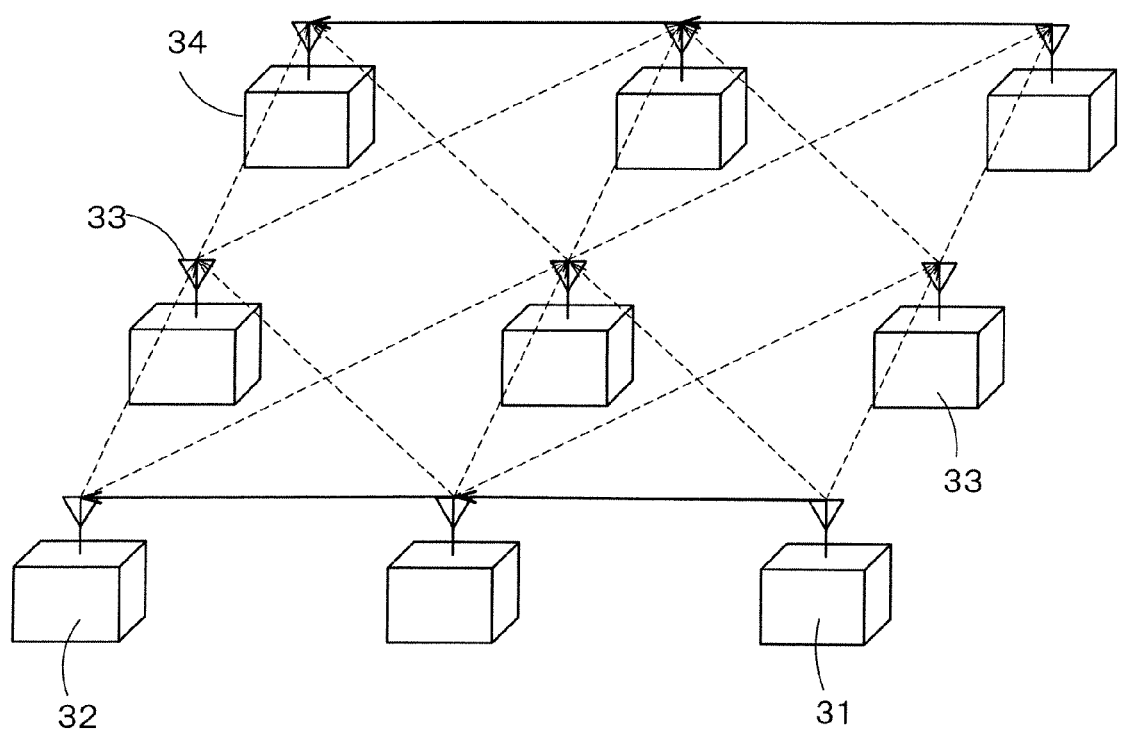
F I G. 15

WIRELESS COMMUNICATION AND WIRELESS COMMUNICATION APPARATUS

CROSS REFERENCE TO RELATED APPLICATIONS

This application is a continuation of U.S. application Ser. No. 10/440,115 filed on May 19, 2003, all of which claim benefit of priority under 35 U.S.C. § 119 to Japanese Patent Application No. 2002-143546, filed on May 17, 2002. The entire contents of these documents are incorporated herein by reference.

BACKGROUND OF THE INVENTION

1. Field of the Invention

The present invention relates to a wireless communication system and a wireless communication apparatus which transmit and receives a signal by using a plurality of wireless apparatuses.

2. Related Art

Recently, an ad-hoc network comes under spotlight. In ad-hoc network, a plurality of terminals communicate without passing through a base station and an access point. In the ad-hoc network, the terminals exchange information by autonomously controlling communication. At this time, it is possible to exchange information with a terminal at a location where a transmission signal does not directly reach, by relaying the signal by another terminal.

A MIMO (Multi-Input Multi-output) transmission system comes under spotlight, too. The MIMO transmission transmits the signal from a plurality of transmission antennas to a plurality of reception antennas, and performs interference suppression and equalization at reception side, such as BLAST (Bell laboratory Layered Space-Time architecture) and a space-time coding. The BLAST has a feature in which transmission information is divided and transmitted in parallel from a plurality of antennas. The space-time coding has a feature in which although the same information is transmitted from a plurality of antennas, coding methods are different for each antenna.

In the network composed of a mobile terminal such as the ad-hoc network, since miniaturization of the apparatus is requested, it may be difficult to mount many types of apparatuses and to perform a complicated processing. Because of this, it is difficult to improve frequency availability, to increase transmission capacity, and to improve communication quality.

SUMMARY OF THE INVENTION

An object of the present invention is to provide a wireless communication system and a wireless communication apparatus capable of increasing transmission capacity, improving the frequency availability, and improving the communication quality.

In order to achieve the foregoing object, a wireless communication system which transmits and receives a signal by using a plurality of wireless apparatuses, comprising:

a first wireless apparatus group having a plurality of transmitting apparatuses, each transmitting a wireless signal based on a first control signal, said first wireless apparatus group forming a first ad-hoc network between said transmitting apparatuses; and a second wireless apparatus group having a plurality of destination apparatuses, each receiving the wireless signal transmitted from said first wireless apparatus group, said second wireless apparatus group transmitting and receiving the wireless signal received by said destination apparatuses based on a second control signal, and said second wireless apparatus group forming a second ad-hoc network between said destination apparatuses different from said first ad-hoc network.

BRIEF DESCRIPTION OF THE DRAWINGS

FIG. 1 is a diagram showing schematic configuration of a first embodiment of a wireless communication system according to the present invention.

FIG. 2 is a block diagram showing internal configuration of a transmitting terminal and a destination terminal.

FIG. 5 is a diagram showing data structure of a transmission request frame in the second embodiment of the wireless communication system according to the present invention.

FIG. 10 is a flowchart showing processing operation of the relay terminal in the third embodiment of the wireless communication system according to the present invention.

FIG. 15 is a block diagram showing schematic configuration of a seventh embodiment of a wireless communication system according to the present invention.

DESCRIPTION OF THE PREFERRED EMBODIMENTS

Figure 3:
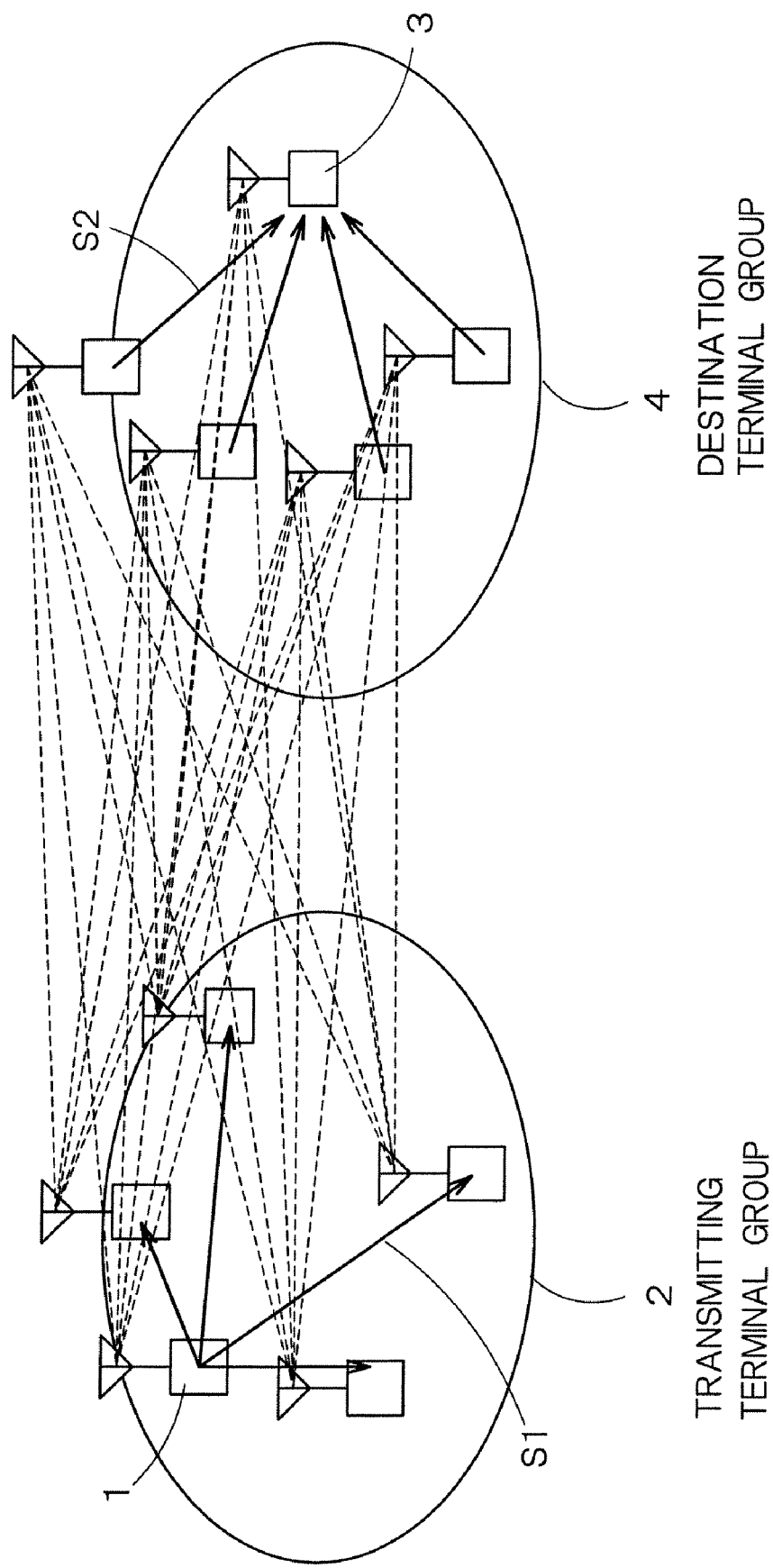
FIG. 3 is a diagram showing schematic configuration of a second embodiment of a wireless communication system according to the present invention.

Hereinafter, a wireless communication system and a wireless communication apparatus according to the present invention will be more specifically described with reference to drawings.

First Embodiment

FIG. 1 is a diagram showing schematic configuration of a first embodiment of a wireless communication system according to the present invention. The wireless communication system of FIG. 1 has a transmitting terminal group 2 consisted of a plurality of transmitting terminals 1 for transmitting a wireless signal based on a control signal S1 transmitted and received to each other, and a destination terminal group 4 consisted of a plurality of destination terminals 3 for receiving substantially at the same time the wireless signal transmitted from the transmitting terminal group 2 based on a control signal S2 transmitted and received to each other.

A MIMO (Multi-Input/Multi-Output) transmission is performed between a transmitting terminal group 2 and a destination terminal group 4, and an SISO (Single-Input/Single-Output) transmission is performed in the transmitting terminal group 2 and the destination terminal group 4. That is, the wireless signal is transmitted and received between the transmitting terminal group 2 and the destination terminal group 4, by using a plurality of antennas, thereby increasing communication capacity.

Inside configuration of the transmitting terminal 1 is the same as that of the destination terminal 3, and is shown in a block diagram of FIG. 2. As shown in FIG. 2, the transmitting terminal 1 and the destination terminal 3 have a single antenna 5, a reception part 6, a transmission part 7, and a control part 8. The reception part 6 has a control signal demodulator 9, a MIMO signal processor 10 and a storage 11. The transmission part 7 has a modulator 12.

The reception part 6 may be omitted from the transmitting terminal 1, and the transmission part 7 may be omitted from the destination terminal 3.

In this embodiment, the frequently data transmitting from transmission terminal group 2 to destination terminal group 4 such as beacons is assumed. And in every transmission, each transmission terminal 1 transmits its own data such as its ID or location data for example.

At each frequently transmission time, the transmitting terminals 1 belonging to the transmitting terminal group 2 transmits and receives the control signal S1 to each other, in order to perform transmission preparation such as synchronization between the transmitting terminals 1 and setting of transmission timing and carrier frequency. The control signal S1 is modulated by the modulator 12 and transmitted from the antenna 5.

The transmitting terminal 1 receiving the control signal S1 demodulates the received control signal S1 by the control signal demodulator 9, and then transmits the signal to the control part 8. The modulator 12 in each transmitting terminal 1 belonging to the transmitting terminal group 2 performs signal processings of information to be transmitted, in accordance with instructions of the control part 8. More specifically, the modulator 12 performs conversion for a base band signal and modulation processing, and transmits the modulated signal from the antenna 5, at transmission timing set in advance. The above-mentioned transmission processing of the transmitting terminal group 2 is called as a dispersion transmission processing.

The destination terminal 3 belonging to the destination terminal group 4 receives the signal, the received signal is once stored in the storage 11. At the same time, characteristics of the received signal are stored in the control part 8, and the information that the destination terminal 3 is necessary for the signal processings is transmitted to the transmission part 7 via the control part 8 as control information. The destination terminals 3 receive the control signal S1 from the other destination terminal 3, and the control part 8 calculates a parameter for the interference suppression and the equalization.

The destination terminals 3 perform the interference suppression processing and the equalization processing by using the information stored in the storage 11, the control information from the other destination terminal 3 and the parameter calculated by the control part 8, in order to estimate the transmission signal and reproduce the information.

The received processing of the above-mentioned destination terminal group 4 is called as a dispersion received processing.

According to the first embodiment, a plurality of transmitting terminals in the transmitting terminal group 2 disperse and transmit the signal from a plurality of transmitting terminals 1 in the transmitting terminal group 2, and a plurality of destination terminals 3 in the destination terminal group 4 receive the dispersed signal at the same time. Because of this, it is possible to realize the MIMO transmission between the transmitting terminal group 2 and the destination terminal group 4, thereby easily transmitting even a large amount of data at high speed. Accordingly, it is possible to improve frequency availability and to increase transmission capacity.

The above-mentioned transmitting terminal 1 and destination terminal 3 are not limited to mobile stations. The present embodiment is also applicable to apparatuses functioned as an access points fixed at an arbitrary location and apparatuses such as a cellular base station fixed at a decided location in advance. When the present embodiment is applicable to the base station and so on, it is possible to reduce an overhead such as exchange of a routing table between terminals.

The antennas held by the transmitting terminal 1 and the destination terminal 3 are not necessarily the single antennas. The present embodiment is applicable to even the case where the terminal contains a plurality of antennas. Even in such a case, if a plurality of transmitting terminals 1 and the destination terminals 3 transmit and receive the dispersed wireless signal, it is possible to improve frequency availability and to increase transmission capacity, as compared with the case transmitted and received by only one transmitting terminal 1 or destination terminal 3.

Second Embodiment

In a second embodiment, the transmitting terminal 1 disperses and transmits signals, based on indication from a representative transmitting terminal 1, and the signals received by the destination terminal 3 is transmitted to the representative destination terminal 3.

FIG. 3 is a diagram showing schematic configuration of a second embodiment of a wireless communication system according to the present invention. The wireless communication system of FIG. 3 has a transmitting terminal group 2 consisted of a plurality of transmitting terminals 1 for dispersing and transmitting the wireless signal, and a destination terminal group 4 consisted of a plurality of destination terminals 3 for transmitting the wireless signal transmitted from the transmitting terminal group 2 substantially at the same time.

One among a plurality of transmitting terminals 1 is a representative transmitting terminal 1, and one among a plurality of destination terminals 3 is a representative destination terminal 3.

The representative transmitting terminal 1 transmits the control signal S1 which informs the transmitting terminals 1 in the transmitting terminal group 2 of transmission request. A portion to be transmitted among the information held by the transmitting terminal 1 is indicated by the control signal S1. If there is a deviation to the amount of information transmitted by the transmitting terminals 1, a portion of the transmission information is transmitted and received to each other, in order to equalize the amount of the transmitted information. The transmitting terminal 1 performs dispersion transmission processing and transmits transmission information from the antenna. Since the BLAST is supposed in this example, the transmitting terminals 1 transmit its own transmission information at the same time.

Figure 4:
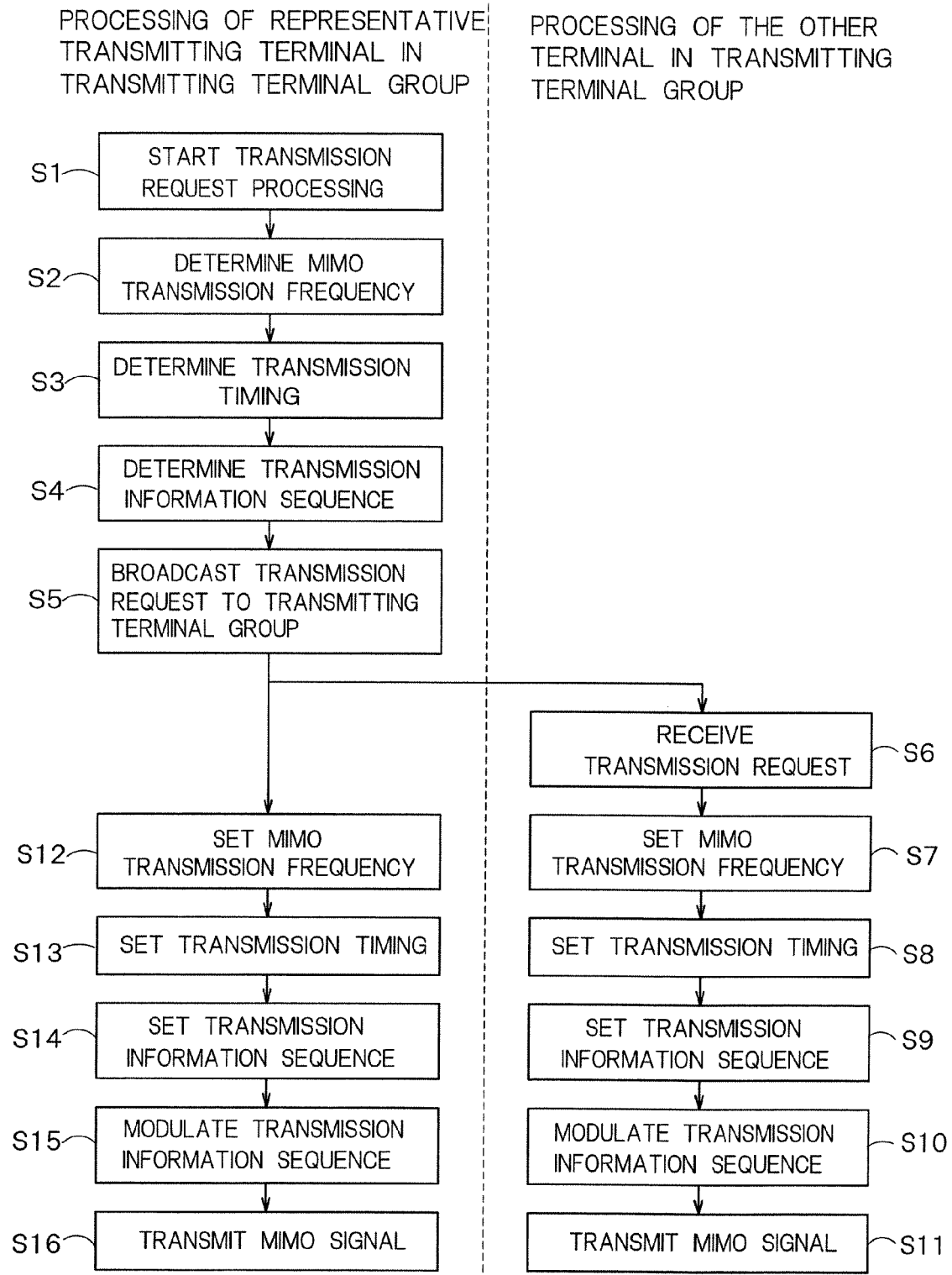
FIG. 4 is a flowchart showing processing operations of transmitting terminals in the second embodiment of the wireless communication system according to the present invention.

FIG. 4 is a diagram showing MIMO signal transmission procedure in the transmitting terminal group 2. The transmission request occurs by the representative transmitting terminal 1 (step S1), the representative transmitting terminal 1 set a transmission carrier frequency and a transmission timing (step S2 and S3). Data sequences to be transmitted is determined among data sequences held by the transmitting terminals 1 in the transmitting terminal group 2, in order to allocate the transmission data sequence to the transmitting terminals in the transmitting terminal group 2 (step S4). These information is broadcasted to the transmitting terminal group 2 by a transmission request frame shown in FIG. 5 (step S5). The transmission request frame corresponds to the control signal S1.

As shown in FIG. 5, the transmission request frame includes a physical layer header d1, a destination terminal address d2, an MIMO transmission frequency d3, an MIMO transmission timing d4, and transmission information of the other terminals d5. Information besides the information shown in FIG. 5 may be included, or a portion of the information shown in FIG. 5 may be omitted.

Since it is unnecessary to designate the transmission data sequence for the representative transmitting terminal 1, it is assumed that transmission data information of its own is not included in the frame.

When the transmitting terminal except for the representative transmitting terminal 1 in the transmitting terminal receives the transmission request (step S6), the transmission frequency for MIMO transmission and reception (carrier frequency), transmission timing and transmission information sequence is set (step S7-S9). After the transmission information sequence is modulated (step S10), the MIMO signal is transmitted (step S11).

On the other hand, after the processing of step S5 is finished, the representative transmitting terminal 1 sets the transmission frequency for MIMO (carrier frequency), the transmission timing and the transmission information sequence (steps S12-S14). After the transmission information sequence is modulated (step S15), the MIMO signal is transmitted (step S16).

The destination terminals 3 in the destination terminal group 4 receiving the above-mentioned transmission signal performs dispersion received processing in order to reproduce the information, and transmits the reproduced information to the representative destination terminal 3. Since the BLAST is supposed in the dispersion received processing, the interference suppression processing is performed. That is, the destination terminals 3 exchange signal waveform transmitted from the transmitting terminal group 2 between the destination terminals, combines a plurality of waveforms, and takes out desirable signals. The taken-out signals are transmitted to the representative destination terminal 3 in sequence, and coupled with each other in the representative destination terminal 3.

Figure 6:
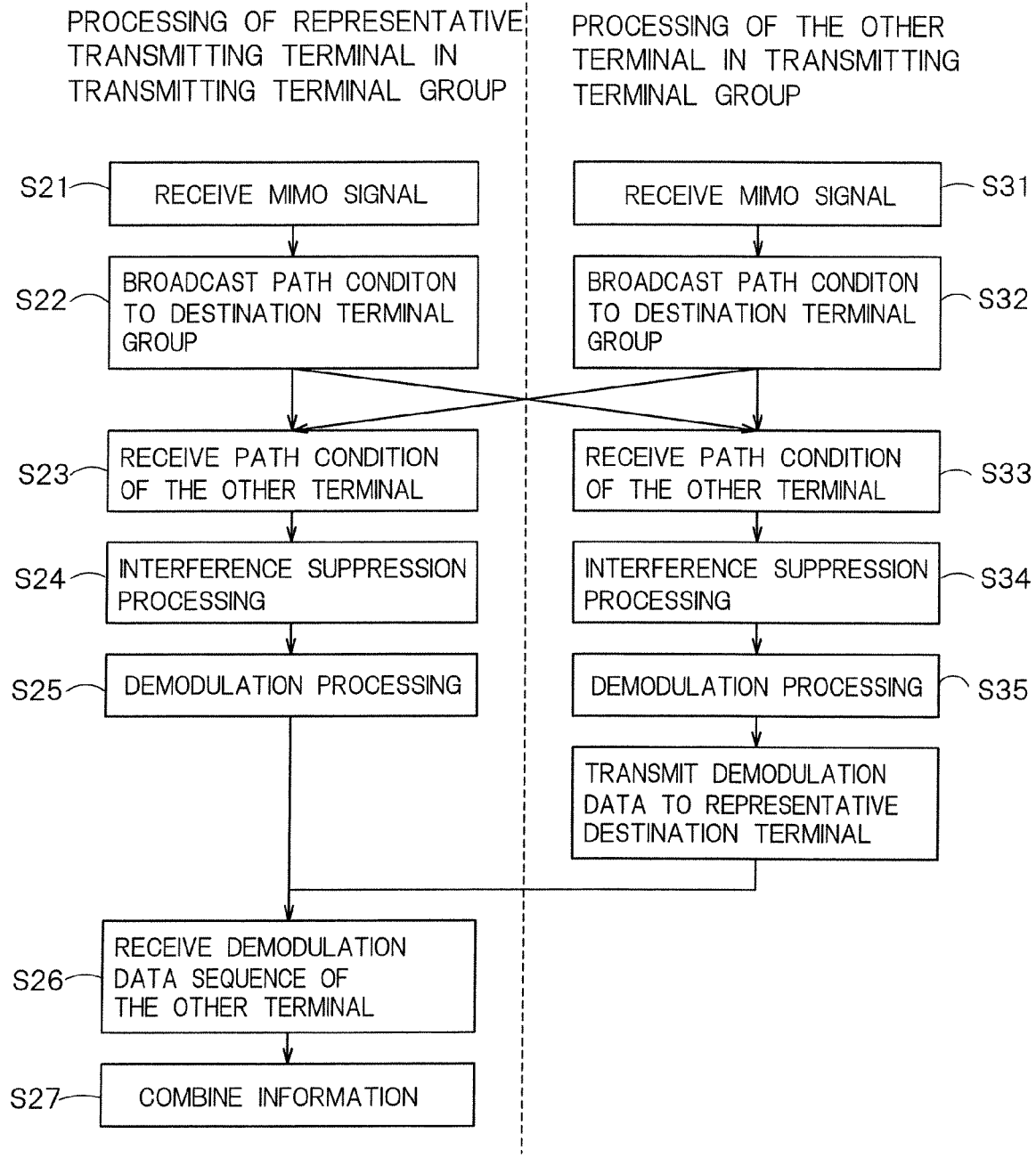
FIG. 6 is a flowchart showing processing operations of the destination terminals in the second embodiment of the wireless communication system according to the present invention.

FIG. 6 is a diagram showing one example of MIMO signal received procedure in the destination terminal group 4. The destination terminal 3 in the destination terminal group 4 receives the MIMO signal (step S21 and S31), and then estimates a path condition based on the received signal. The estimated path condition is described in a path condition notification frame shown in FIG. 7, and broadcasts in the destination terminal group 4. The path condition notification frame has a physical header d6 and a path condition d7 shown in FIG. 7. The destination terminal 3 receives the path condition notification frame (steps S23 and S33), and performs the interference suppression processing for the received signal by using the path condition estimated by the other destination terminal 3 and the path condition estimated by its own (steps S24 and S34). And then the destination terminal 3 performs demodulation processing (steps S25 and S35), and reproduces the received data sequence. The data sequence is transmitted to the representative destination terminal 3 by using a demodulation data sequence notification frame as shown in FIG. 8 (step S36). The demodulation data sequence notification frame has a physical header d8 and a demodulation data sequence d9 as shown in FIG. 8.

The representative destination terminal 3 combines the demodulation data sequence received by the terminals (steps S26 and S27), and obtains data transmitted by the transmitting terminal group 1.

The method of combining data in such a case is a coupling processing when the terminals transmit different data as shown in the BLAST, and a combined processing which improves probability by calculating sum of the same bit when the terminals transmit the same information as shown in the space-time coding. The path condition notification frame of FIG. 7 and the demodulation data sequence notification frame of FIG. 8 correspond to the control signal S2.

According to the second embodiment, a plurality of destination apparatuses 3 receive the information dispersed and transmitted by a plurality of transmitting terminals 1, based on indication from the representative transmitting terminal 1, and the destination terminals 3 transmit the received signal to the representative destination terminal 3. Because of this, it is possible to transmit a large amount of data at high speed, by using a plurality of transmitting terminals 1 and destination terminals 3. Because the transmitting terminals 1 transmit information to the received terminals by using carrier waves of frequencies different from each other, thereby improving frequency availability.

The second embodiment is also applicable to the case where the transmitting terminals 1 do not hold the dispersed information, but holds copies of the same information. In this case, the MIMO transmission system such as the space-time coding in which single antennas of all the transmitting terminals 1 transmit the same information.

This is similar even to the other embodiments described below.

Third Embodiment

A third embodiment is a modified example of the first embodiment, and a relay terminal group is provided between the transmitting terminal group 2 and the destination terminal group 4.

Figure 9:
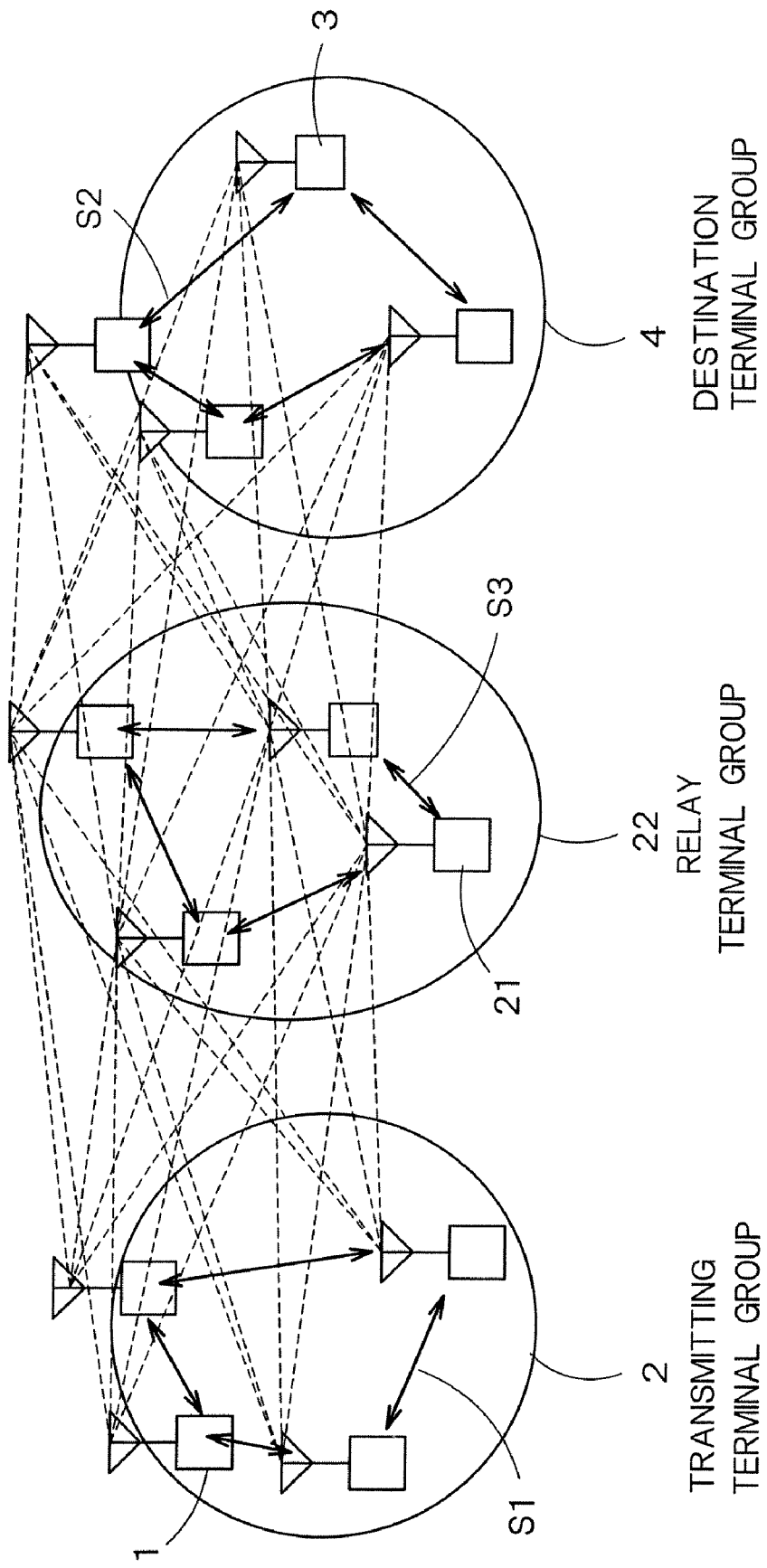
FIG. 9 is a diagram showing schematic configuration of the third embodiment of the wireless communication system according to the present invention.

FIG. 9 is a diagram showing schematic configuration of the third embodiment of a wireless communication system according to the present invention. The wireless communication system of FIG. 9 has a transmitting terminal group 2 consisted of a plurality of transmitting terminals 1 for dispersing and transmitting the wireless signal based on a control signal S1 transmitted and received to each other, a relay terminal group 22 consisted of a plurality of relay terminals 21 for receiving the wireless signal transmitted from the transmitting terminal group 2 substantially at the same time based on a control signal S2 transmitted and received to each other, and dispersing and transmitting the received wireless signal, and a destination terminal group 4 consisted of a plurality of destination terminal 3 for receiving the wireless signal transmitted from the relay terminal group 22 substantially at the same time by transmitting and receiving the control signal to each other.

In FIG. 9, when transmission request of the information from the transmitting terminal group 2 to the destination terminal group 4 occurs, the transmitting terminals 1 of the transmitting terminal group 2 perform dispersion transmission processing based on the control signal S1, and transmits a portion of the transmission information from the antennas. The relay terminal 21 in the relay terminal group 22 receives the signal transmitted by the transmitting terminal 1, performs the dispersion received processing, and reproduces the transmission information. The relay terminal group 22 again performs dispersion transmission processing for the reproduced transmission information, and transmits the signal after the dispersion transmission processing from the antenna. The transmission signal from the relay terminal group 22 is received by the destination terminal 3 in the destination terminal group 4. And then the dispersion receiving processing is performed and reproduced.

FIG. 10 is a flowchart showing one example of the MIMO signal receiving procedure of the destination terminal group 4. The relay terminals 21 in the relay terminal group 22 receives the MIMO signal (step S41), performs the same processing as that of the destination terminal 3 in the second embodiment, and performs demodulation processing (steps S42-S45). The demodulation data is broadcasted by the demodulation data sequence frame in the relay terminal group 22 (step S46).

Subsequently, the relay terminals 21 receive the demodulation data sequence notification frame (step S47), combine the demodulation data, perform information division if the system for dividing and transmitting the information as the BLAST is used, generates the relay information sequence, and sets the relay information sequence to a transmitter (step S48). At the same time, the MIMO transmission frequency and the transmission timing are also set (steps S49 and S50).

It is assumed that the MIMO transmission frequency is the same frequency as a frequency received, for example, at relay time, and transmission timing is a time later than received time by a constant time τ. After these settings are finished, the transmission information is modulated (step S51), and the MIMO signal is transmitted in accordance with the transmission timing (step S52).

According to the third embodiment, since the relay terminal group 22 is performed between the transmitting terminal group 2 and the destination terminal group 4, even if a distance between the transmitting terminal group 2 and the destination terminal group 4 is long, it is possible to perform a large amount of MIMO transmission. Furthermore, if the relay terminal group 22 relays the signals, it is unnecessary to communicate with the base station, thereby reducing hardware cost of the entire system. Moreover, according to the present embodiment, it is possible to shorten transmission radius of the transmitting terminals 1 in the transmitting terminal group 2, thereby reducing transmission power of the transmitting terminals 1, and lengthening talk times.

The relay terminal group 22 is not necessarily one. The signal may be distributed to the destination terminal group 4 via a plurality of relay terminal group 22. In this case, the signal transmitted from the relay terminal group 22 receives by the other relay terminal group 22. This is repeated, and the signal transmitted from the last relay terminal group 22 is received by the destination terminal group 4. In this example, the relay terminal 21 demodulates the MIMO signal, reproduces the demodulated signal, and again modulates the reproduced signal. However, without demodulating the signal, non-reproducing relay in which the signal is amplified for itself and again transmitted without demodulation, may be used.

Fourth Embodiment

In a fourth embodiment, a plurality of transmitting terminals 1 each having a single antenna transmit wireless signals to a destination terminal 3 having a plurality of antennas via a plurality of relay terminals 21.

Figure 11:
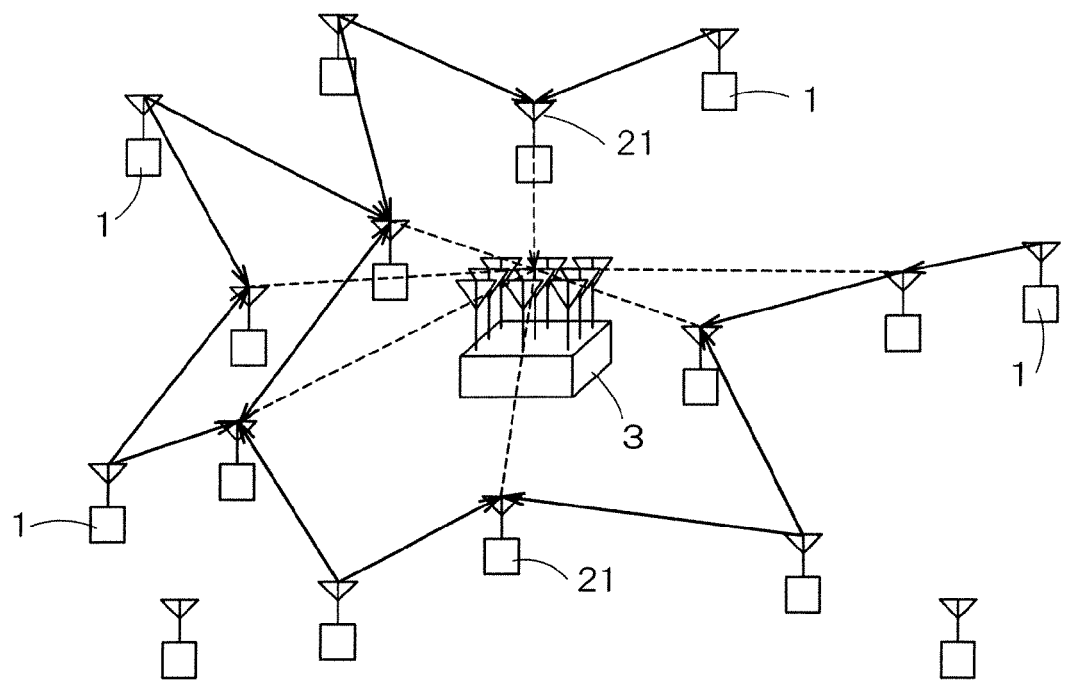
FIG. 11 is a diagram showing schematic configuration of a fourth embodiment of the wireless communication system according to the present embodiment.

FIG. 11 is a diagram showing schematic configuration of a fourth embodiment of a wireless communication system according to the present invention. The wireless communication system of FIG. 11 has a plurality of transmitting terminals 1 each transmitting the wireless signals substantially at the same time, a plurality of relay terminals 21 each being able to receive the wireless signal from at least one transmitting terminal 1 and to disperse and transmit the received signal, and a destination terminal 3 having a plurality of antennas for receiving the wireless signal transmitted from a plurality of relay terminals 21 substantially at the same time.

In FIG. 11, when transmission request occurs from the transmitting terminal 1 to the destination terminal 3, a plurality of transmitting terminals 1 perform signal processing for the MIMO transmission such as the BLAST or the space-time coding, and the signal is transmitted to the peripheral relay terminals 21 by using the antennas of the transmitting terminals 1. A plurality of relay terminals 21 receives the transmission information, and transmits the received signal again. The signals transmitted from the relay terminals 21 are received by the destination terminal 3.

Figure 12:
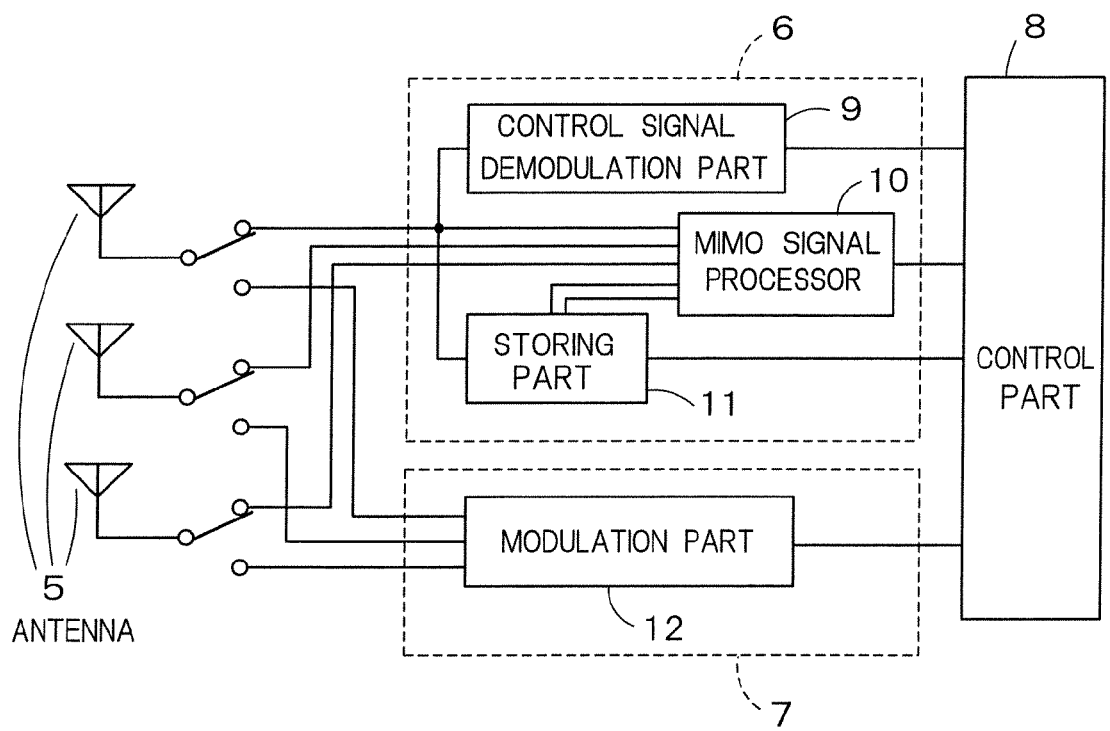
FIG. 12 is a block diagram showing one example of internal configuration of determination apparatus of the fourth embodiment.

The destination terminal 3 receives the wireless signal from a plurality of relay terminals 21 substantially at the same time, performs dispersion received processing, and reproduces the transmission information. As the destination terminal 3, for example, an apparatus shown in FIG. 12 in which a plurality of antennas proposed conventionally are provided to one terminal can be used. The apparatus of FIG. 12 has a feature in which the received signals of a plurality of antennas is collectively processed by the MIMO signal processor 10.

According to the fourth embodiment, it is possible to realize the MIMO in the signal transmission from the transmitting terminal 1 to the relay terminal 21, thereby improving frequency availability. If the transmitting terminal 1 is the base station or an access point, it is possible to apply the system of the present embodiment to a subscriber system wireless access system or a wireless LAN.

A plurality of relays described above may be performed from the transmitting terminal 1 to the destination terminal 3. In this case, similarly to the third embodiment, the information received by the relay terminal group 22 is reproduced by dispersion received processing. And then the dispersion transmission processing is performed again, and the information is transmitted to the other relay terminals.

Fifth Embodiment

In fifth embodiment, the wireless signal is transmitted to the destination terminal 3 having a single antenna from a transmitting terminal 1 having a plurality of antennas via a relay terminal 21.

Figure 13:
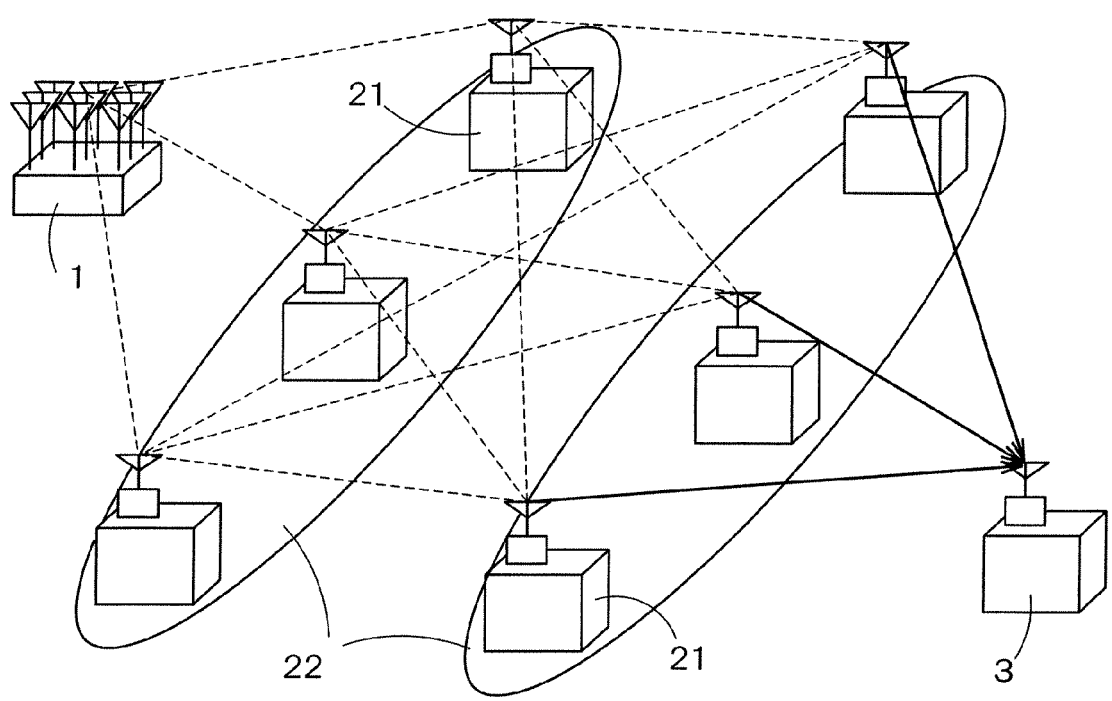
FIG. 13 is a diagram showing schematic configuration of a fifth embodiment of a wireless communication system according to the present invention.

FIG. 13 is a diagram showing schematic configuration of a fifth embodiment of a wireless communication system according to the present invention. The wireless communication system of FIG. 13 has a transmitting terminal 1 having a plurality of antennas, a relay terminal group 22 consisted of a plurality of relay terminals 21 each having a single antenna, and a destination terminal 3 for receiving the wireless signal transmitted from the relay terminal 21 substantially at the same time.

The transmitting terminal 1 disperses and transmits the transmission information from a plurality of antennas. A plurality of relay terminals 21 receive the wireless signal transmitted from the transmitting terminal 1, and transmits the received signal. One or more relay terminal groups 22 may be provided as shown in FIG. 6.

When a plurality of relay terminal groups 22 are provided, the relay terminal group 22 receiving the transmission signal from the transmitting terminal 1 disperses and transmits the received signal to a plurality of relay terminals 22 in the other relay terminal group 22.

In FIG. 13, when transmission request occurs from the transmitting terminal 1 to the destination terminal 3, the transmitting terminal 1 performs the signal processings for the MIMO transmission such as BLAST or the space-time coding, and transmits the signal to the peripheral relay terminal group 22 by using a plurality of antennas mounted. A plurality of relay terminals 21 in the relay terminal group 22 receiving the signal reproduces the information by the dispersion received processing. Although the reproduced signal is transmitted to the destination terminal 3, the destination terminal 3 has only a single antenna. Accordingly, the SISO transmission is performed. The reproduced received information is transmitted to the destination terminal 3 by using a packet communication system using a frequency division or time division, or a wide band transmission system such as OFDM or CDMA.

According to the fifth embodiment, since the MIMO transmission is performed in signal transmission from the transmitting terminal 1 to the relay terminal 21, it is possible to improve frequency availability. In this embodiment, if the transmitting terminal 1 is the base station or the access point, it is possible to apply the system to the subscriber system wireless access or the wireless LAN.

A plurality of relays may be performed from the transmitting terminal 1 to the destination terminal 3. In this case, the information received by the relay terminal group 22 is reproduced by the dispersion received processing, and is again transmitted to the other delay terminal group 22 after the dispersion transmission processing.

Sixth Embodiment

In sixth embodiment, a relay terminal 21 is disposed between a transmitting terminal 1 having a plurality of antennas and a destination terminal 3 having a plurality of antennas.

Figure 14:
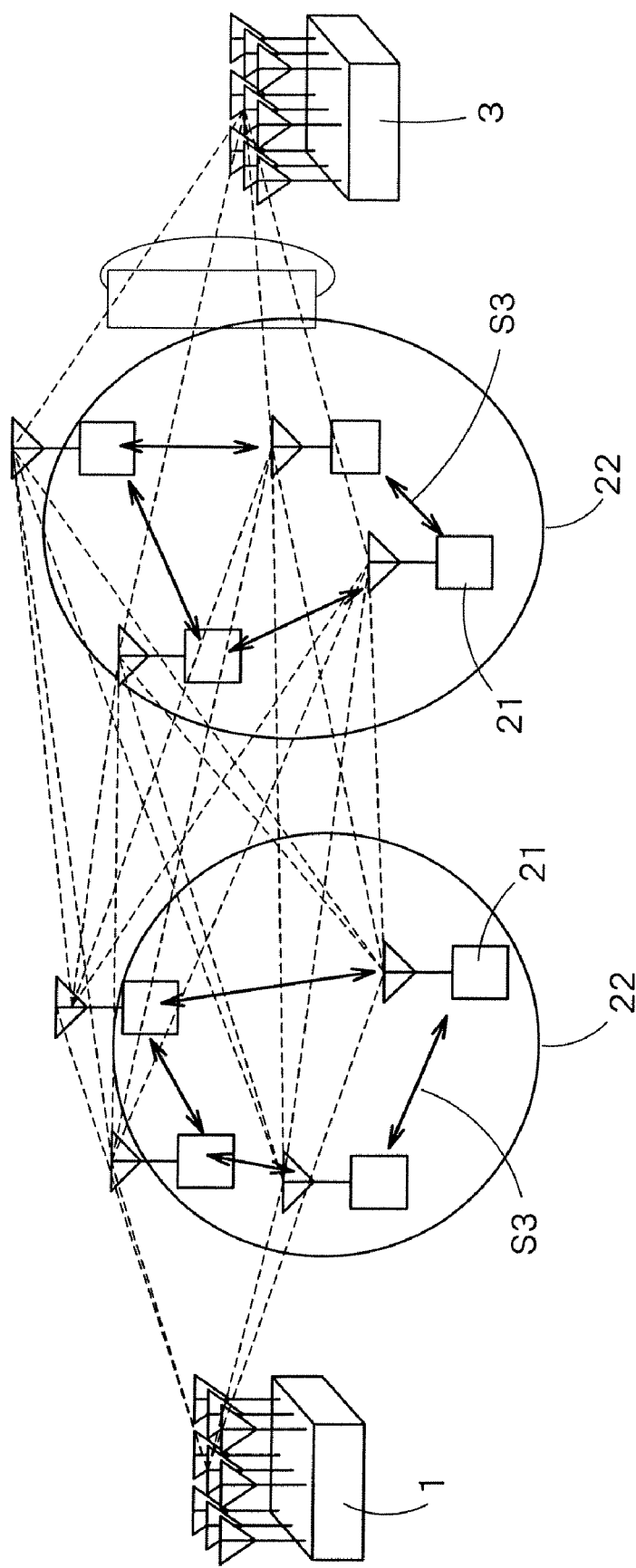
FIG. 14 is a block diagram showing schematic configuration of a sixth embodiment of a wireless communication system according to the present invention.

FIG. 14 is a block diagram showing schematic configuration of a sixth embodiment of a wireless communication system according to the present invention. The wireless communication system of FIG. 14 has a transmitting terminal 1 for transmitting the wireless signal from a plurality of antennas substantially at the same time, a relay terminal group 22 consisted of a plurality of relay terminals 21 for dispersing and transmitting the received signal, and a destination terminal 3 for receiving the wireless signal transmitted from the relay terminal group 22 by a plurality of antennas substantially at the same time.

In FIG. 14, when transmission request occurs from the transmitting terminal 1 to the destination terminal 3, the transmitting terminal 1 performs signal processing for the MIMO transmission, and then transmits the wireless signals to the peripheral relay terminal group 23 by using a plurality of antennas mounted.

The relay terminals 21 in the relay terminal group 22 receiving the wireless signal from the transmitting terminal 1 performs the dispersion received processing and reproduces the transmission information. The dispersion transmission processing is performed for the reproduced transmission information, and then the information is transmitted to the destination terminal 3. The destination terminal 3 receives the signal by a plurality of antennas mounted. The signal processings are performed for the received signal, and the transmission information is reproduced.

Figure 7:
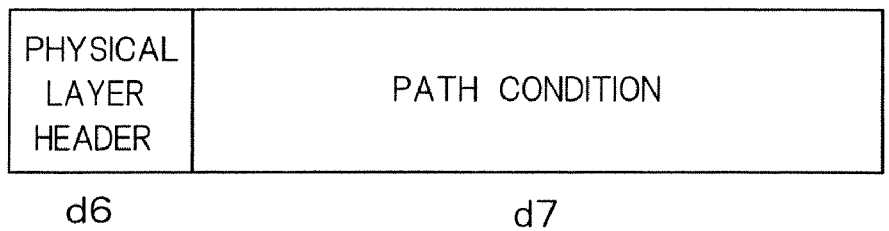
FIG. 7 is a diagram showing data structure of the path condition notification frame in the second embodiment of the wireless communication system according to the present invention.
Figure 8:
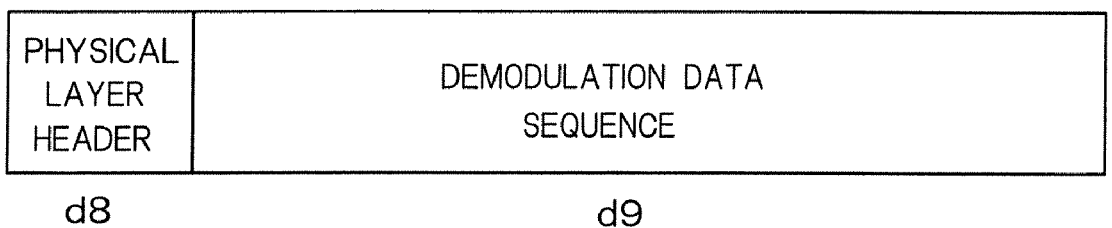
FIG. 8 is a diagram showing data structure of demodulation data sequence notification frame in the second embodiment of the wireless communication system according to the present invention.

A plurality of relay terminal groups 22 are provided between the transmitting terminal 1 and the destination terminal 3, as shown in FIG. 7, and a plurality of relays as described above may be performed. In this case, the information received by the relay terminal group 22 is reproduced by the dispersion received processing, the dispersion transmission processing is performed, and then the information is transmitted to the other relay terminal group 22.

According to the sixth embodiment, it is possible to realize the MIMO in signal transmission from the transmitting terminal 1 to the destination terminal 3, thereby performing a large amount of transmission. Furthermore, if the transmitting terminal 1 or the destination terminal 3 is assumed to be the base station or the access point, it is possible to apply the present embodiment to a link between the base stations and communication between the wireless LANs.

Seventh Embodiment

In a seventh embodiment, a transmitting terminal 1 having a single antenna transmits transmission information to the destination terminal 3 having a single antenna via a plurality of relay terminals 21.

FIG. 15 is a block diagram showing schematic configuration of a seventh embodiment of a wireless communication system according to the present embodiment, and shows system configuration for communication between base stations in a fixed wireless access system and so on.

The wireless communication system of FIG. 15 has a transmitting terminal 31 for transmitting the wireless signal from the single antenna to peripheral base station 32, a plurality of relay base stations 33 for receiving the wireless signal transmitted from the base station 32, and a destination base station 34 for receiving the wireless signal dispersed and transmitted from base station 32 substantially at the same time. The destination base station 34 and a plurality of relay base stations 33 have single antennas, respectively.

If transmission request occurs from the transmitting terminal 31 to the destination base station 34, the transmission base station 31 divides information, and the divided information is transmitted to the peripheral base station 32 by the SISO transmission. At this time, the divided information may be transmitted to the other base station 32 by using relay transmission by the base station 32.

The base station 32 receiving division information performs dispersion transmission processing for the received information, and transmits the received information at the same time as the other base stations 32. The relay base station 33 receiving the signal exchanges the information with the other relay base station 33 receiving the signal, performs the dispersion received processing for the received signal, and reproduces the information. The dispersion transmission processing is again performed for the reproduced signal, and the reproduced signal is transmitted to the destination base station 34 and the peripheral base station 32. The base station 32 located at the periphery of the destination base station 34 performs the dispersion received processing for the received signal, and transmits the signal to the destination base station 34 by the SISO transmission.

A plurality of relays as described above may be performed from the transmission base station 31 to the destination base station 34. In this case, similarly to the sixth embodiment, the relay base station 33 reproduces the received information by the dispersion received processing, performs the dispersion transmission processing, and transmits the information to the relay base station 33.

According to the seventh embodiment, when the wireless signal is transmitted from the transmission base station 31 to the destination base station 34, the MIMO transmission is performed via a plurality of relay base station 33, thereby improving frequency efficiency and frequency availability.

What is claimed is:

1. A wireless communication method which transmits and receives a signal by using a plurality of wireless apparatuses, comprising:
   forming a first wireless apparatus group having a plurality of transmitting apparatuses, each transmitting a wireless signal based on a first control signal, said first wireless apparatus group forming a first ad-hoc network between said transmitting apparatuses;
   forming a second wireless apparatus group having a plurality of destination apparatuses, each receiving the wireless signal transmitted from said first wireless apparatus group, said second wireless apparatus group transmitting and receiving the wireless signal received by said destination apparatuses based on a second control signal, and said second wireless apparatus group forming a second ad-hoc network between said destination apparatuses different from said first ad-hoc network; and
   forming a relay apparatus group having a plurality of relay apparatuses which receives the wireless signal transmitted from said first wireless apparatus group, and transmits the received wireless signal,
   wherein said second wireless apparatus group receives the wireless signal transmitted from said relay apparatus group based on said second control signal.

2. The wireless communication method according to claim 1,
   wherein each of said transmitting apparatuses including:
   modulating transmission information by a modulator;
   providing the transmission information in accordance with said first control signal from a control part to said modulator; and
   transmitting by an antenna the signal modulated by said modulator.

3. The wireless communication method according to claim 1,
   wherein each of said destination apparatuses including:
   receiving the wireless signal by an antenna;
   demodulating by a demodulator the wireless signal received by said antenna; and
   performing control to transmit the signal demodulated by said demodulator to the other destination apparatus, based on said second control signal.

4. The wireless communication method according to claim 1,
   wherein said first wireless apparatus group has a certain transmitting apparatus which designates contents transmitted by said transmitting apparatuses, based on said first control signal; and
   said second wireless apparatus group has a certain destination apparatus which requests transmission of the wireless signal received by said destination apparatuses, based on said second control signal.

5. The wireless communication method according to claim 4,
   wherein said certain transmitting apparatus has a control part which designates the wireless signal to be transmitted by the other transmitting apparatus by said first control signal; and
   said certain destination apparatus includes:
   a reception part which receives the received information of the other destination apparatus transmitted by said other destination apparatus; and
   a signal processor which combines the received information of said other destination apparatus received by said reception part.

6. The wireless communication method according to claim 1,
   wherein said first control signal includes information relating to a transmission frequency, a transmission timing, and a transmission information sequence.

7. The wireless communication method according to claim 1,
   wherein said second control signal includes information relating to path condition and received information sequence.

8. The wireless communication method according to claim 1,
   wherein said relay apparatuses including:
   receiving by a first reception part the wireless signal transmitted from said first wireless apparatus group;
   demodulating by a demodulator the wireless signal received by said reception part;
   broadcasting by a first transmission part the demodulation signal demodulated by said demodulator to said relay apparatus group;
   receiving by a second reception part the signal broadcasted from said first transmission part of the other relay apparatus;
   setting by a transmission control part transmission frequency, transmission frequency, transmission timing and transmission information sequence when the signal received by said second reception part is transmitted to said second wireless apparatus group; and
   transmitting by a second transmission part the signal received by said second reception part to said second wireless apparatus group based on contents set by said transmission control part.

9. A wireless communication method, comprising:
   transmitting a wireless signal by a first wireless apparatus having at least one antenna;
   forming a relay apparatus group having a plurality of relay apparatuses each receiving the wireless signal from said first wireless apparatus, and transmitting the received signal; and
   receiving the wireless signal transmitted from said relay apparatuses by a second wireless apparatus having at least one antenna,
   wherein said relay apparatus group including:
   receiving by a plurality of first relay apparatus the wireless signal transmitted from said first wireless apparatus, and transmitting the received wireless signal; and
   receiving by a second relay apparatus the wireless signal transmitted from two or more of said first relay apparatuses, and transmits the received wireless signal, wherein said second wireless apparatus receives the wireless signal transmitted from at least one of said first and second relay apparatuses.

10. The wireless communication method according to claim 9,
wherein said first wireless apparatus has a plurality of antennas which transmit the wireless signal; and
each of said relay apparatuses has a single antenna, receives the wireless signal transmitted by the antennas, and transmits the received signal, respectively.

11. The wireless communication method according to claim 9,
wherein said first wireless apparatus has a plurality of antennas which transmit the wireless signals; and
said second wireless apparatus has a plurality of antennas which receives the wireless signals.

12. The wireless communication method according to claim 11, comprising:
receiving by a relay apparatus group the wireless signal transmitted from said antennas of said first wireless apparatus based on a control signal, and dispersing and transmitting the received wireless signal,
wherein said antennas of said second wireless apparatus receive the wireless signal transmitted from said relay apparatus group.

13. The wireless communication method according to claim 9,
wherein said first wireless apparatus, said first relay apparatuses, said second relay apparatus and said second wireless apparatus have single antennas, respectively.

14. A wireless communication method, comprising:
receiving by a first reception part a wireless signal transmitted from a first wireless apparatus group;
demodulating by a demodulator the wireless signal received by said first reception part;
broadcasting by a first transmission part a demodulation signal demodulated by said demodulator to relay apparatuses;
receiving by a second reception part a signal broadcasted from the other relay apparatus;
setting by a transmission control part transmission frequency, transmission timing and transmission information sequence when the signal received by said second reception part is transmitted to a second wireless apparatus group; and
transmitting by a second transmission part the signal received by said second reception part to said second wireless apparatus group based on contents set by said transmission control part,
wherein the first wireless apparatus group has a plurality of transmitting apparatuses, each transmitting a wireless signal based on a first control signal, said first wireless apparatus group forming a first ad-hoc network between said transmitting apparatuses; and
a second wireless apparatus group has a plurality of destination apparatuses, each receiving the wireless signal transmitted from said first wireless apparatus group, said second wireless apparatus group transmitting and receiving the wireless signal received by said destination apparatuses based on a second control signal, and said second wireless apparatus group forming a second ad-hoc network between said destination apparatuses different from said first ad-hoc network.

* * * * *